United States Patent Office 3,318,815
Patented May 9, 1967

3,318,815
GERMICIDAL TOILET BOWL CLEANING
COMPOSITION
Harry E. Remler and Charles J. Butke, Cincinnati, Ohio,
assignors to The Drackett Company, Cincinnati, Ohio,
a corporation of Delaware
No Drawing. Filed July 21, 1965, Ser. No. 473,813
5 Claims. (Cl. 252—106)

This invention, which is a continuation-in-part of copending application Ser. No. 188,946 now abandoned, relates to the art of toilet bowl cleaners and is directed more particularly to a toilet bowl cleaning composition having germicidal properties.

Through the years, a number of compositions have been proposed for use in cleaning toilet bowls or other receptacles having surfaces maintained for long periods of time in contact with water. Such surfaces are subject to staining by dissolved metallic salts, such as those of iron and copper, or to encrustation with insoluble carbonate compounds, principally calcium carbonate and magnesium carbonate, precipitated from hard water. In order to dissolve these stains and encrustations, the cleaning composition must be strongly acidic and, for this reason, virtually all toilet bowl cleaners currently on the market utilize large amounts of sodium bisulfate. In addition, they often contain minor amounts of a compound capable of liberating carbon dioxide by reaction with sodium bisulfate, for example, sodium carbonate or sodium bicarbonate. The evolution of gas is advantageous for two reasons: first, it contributes a stirring action, bringing the surfaces to be cleaned uniformly in contact with the cleaning solution, and second, it aids in the dissolution of the solid cleaning agent. Small quantities of other materials may be also present, including various cleaning promoters, such as sodium chloride, one or more wetting agents and the like as well as nonfunctional additives, i.e. perfumes or the like.

From the intended use alone, one would immediately appreciate the value of providing a composition of this type having germicidal properties. This goal, however, has proved difficult of attainment in practice. A great variety of bactericidal agents are known in the art but, almost without exception, their effectiveness is essentially destroyed at the very low pH's necessarily obtaining with the present class of compositions. For example, when a typical commercial bowl cleaner is diluted to the same extent as would be the case under ordinary conditions of use, the resultant solution has a pH in the order of 1.5-2. It is, of course, well known that numerous chlorine-containing compounds, both organic and inorganic, are adapted to liberate chlorine, under certain conditions, especially at an acid pH, and that chlorine itself in appropriate concentrations is a highly effective germicidal agent. However, the inherent instability of these compounds in a strongly acid environment, while of possible advantage in causing release of the chlorine under some conditions of use, constitutes a serious disadvantage for purposes of preparation and storage of the composition itself. Sodium bisulfate has distinct hygroscopic tendencies and an initially dry mixture of this compound and a chlorine liberator attracts sufficient moisture from the atmosphere to cause decomposition of the liberator. Moreover, in its usual commercial form, bisulfate has a hydrated surface coating which is characterized by a relatively low melting point, say about 140° F. Thus, even assuming that moisture can be entirely excluded, should the mixture be subjected to a temperature of this magnitude, an entirely likely eventuality in the course of transit in a box car or storage in a warehouse during the summer months, the surface coating undergoes melting and will react with the liberator. Consequently, as a matter of common practice, many manufacturers of chlorinating compounds specifically warn against admixing such compounds with strongly basic or acidic materials.

Some purveyors of toilet bowl cleaners of the type in question have attempted to circumvent these difficulties by incorporating a strong bacteriostat. It is the nature of a bacteriostat to check or prevent bacterial growth so that the inclusion of such an agent gives the appearance of germicidal properties in that when a contaminated sample containing the agent is cultured, no growth will occur due to the inhibiting effect of the agent. However, such agents are not capable of actually destroying bacteria unless large amounts are employed, which is impractical for reason of expense, thus when their effect is discontinued, either by removal of the agent, as when the toilet is flushed, or by the addition of an antidote, the initially present bacteria flourish as freely as though they had never been exposed to the bacteriostat.

In U.S. Patent 2,393,716 it was reported that stable solid mixtures of an acidic salt of an alkali metal and an unstable N-chlorosulfonamide could be obtained provided the aromatic radical of the sulfonamide was no more electronegative than the phenyl radical. The principal example of satisfactory N-chlorosulfonamides was chloramine-B (sodium-phenyl-N-chlorosulfonamide). Actual experiments with this compound in association with the strongly acidic sodium bisulfate of the present composition, however, have revealed that a substantial loss in available chlorine, in the order of 25% of that initially present, is observed after contact for a period of approximately one week at temperatures of about 125° F. Consequently, this patent does not constitute an answer to the problem of compound a toilet bowl cleaner of the present type having germicidal properties.

After much experimentation, all of which gave results of an unpromising nature, it was conceived that the reaction between the bisulfate and a chloride-containing compound could perhaps be prevented by way of the addition of a dry solid, powdered inert protective coating medium, such as finely divided clay. When this concept was put into practice with inorganic chlorine-containing compounds, for example, calcium and lithium hypochlorite, which are probably the most widely used chlorinating agents at the present time, the results were no better than before. Thus, virtually all of the available chlorine was found to be lost after a few hours of exposure to elevated temperature irrespective of whether the protective coating medium was present or absent. After such discouraging performance with inorganic chlorine liberators and other conventional bactericides, it was altogether surprising and unpredictable to discover that a certain class of organic chlorine-containing compounds could be effectively protected against decomposition in the presence of solid sodium bisulfate by means of certain finely-divided inert protective media to the extent that less than 10% of the available chlorine theoretically present was lost after many hours of exposure to the elevated temperature.

It has been proposed in Pape 2,497,057 to provide a toilet bowl cleaner in tablet form having as principal ingredients an alkali metal acid sulfate and sodium bicarbonate or some other gas-releasing compound, premature reaction therebetween being prevented by coating the particles thereof with a stabilizer. The preferred stabilizer was a solid, waxy polyethylene glycol applied from a solution in a volatile solvent, such as toluol. Sulfamic acid and azelaic acid were named as other satisfactory stabilizers. Among the optional ingredients disclosed was a bactericide, such as calcium hypochlorite or copper sulfate.

While the compounds mentioned as stabilizers in this patent may be quite satisfactory for preventing reaction between the bisulfate and bicarbonate, they are distinctly unsuited for preventing decomposition of any chlorine-liberating agent included as a bactericide. As is well known, chlorinating agents tend to react with a wide variety of organic compounds and in the case of strong chlorinating agents, such as the inorganic hypochlorites, this reaction can proceed in an uncontrollable, even explosive, manner. While with weaker agents, the reaction is less violent, it nonetheless results in significant loss of available chlorine. The protective technique used by the patentee is subject to the further disadvantage of a solvent system of application which requires expensive measures to prevent explosion and recover the solvent.

Another known composition broadly similar to this invention is described in Lee et. al. 3,120,378, where an alkali metal carbonate, a hydrate forming compound, a dichlorocyanurate, and a solid acid are mixed together and tabletted under pressure and in the presence of sufficient water to bind the ingredients together into a mechanically strong tablet, the water being supplied either by release from the hydrate as a result of the compression or directly with any free water being taken up by the hydrate forming compound upon removal of the pressure. The resultant product is said to be stable and to have good sterilizing, disinfecting, and bleaching properties when dissolved in water. The solid acid can be an alkali metal acid sulfate, among others, and the list of optional ingredients includes anionic organic detergents, fillers and the like.

Apparently the stability of the Lee et. al. product is due entirely to its structural form as provided by the tabletted shape and the binding action of the water. Thus, when the only specific embodiment of the patent which includes sodium acid sulfate is reproduced, except that the mixture is left in powdered condition instead of being tabletted, and tested for stability, substantial loss of chlorine results. Nor is any improvement obtained by incorporating a small amount of an anionic organic detergent in the powdered mixture; rather, the loss of chlorine is increased.

Obviously, Lee et al. do not provide the answer to the problem of providing a stable, chlorine-liberating acid toilet bowl cleaner in granular form, with the significant advantages the latter form possesses over the tabletted form. In the first place, tabletting in large volume adds materially to the manufacturing expense, automatic equipment for carrying out the operation being alone quite costly. Secondly, when a powdered cleaner is sprinkled on the damp surface of the toilet bowl above the water line and spread over these surfaces with a brush or swab, all as directed, it results in an initially highly concentrated solution at these surfaces which has a more effective cleaning action than the same amount of product dissolved in the entire contents of the bowl, as must necessarily be the case with a tablet.

Finally, the addition of germicides of the chloramine type to conventional detergent compositions is recognized, for instance, in Gray 2,809,937. Such compositions are ordinarily well on the alkaline side and therefore are not subject to the same problem encountered in the strongly acidic class of products with which this invention is concerned.

A primary object of the invention is, therefore, a solid particulate toilet bowl cleaning composition, containing as its essential cleaning agent sodium bisulfate, which has effective germicidal properties and is adapted to be stored in a closed container without severe loss of such properties for a period of time corresponding to that required for normal distribution and sale under most extreme conditions of weather.

Another object of the present invention is an acidic toilet bowl cleaner comprising a major amount of sodium bisulfate granules and a bactericidal amount of a solid organic compound adapted to release free chlorine when dissolved in water, wherein the chlorine liberating compound is maintained in substantially unreacted condition by the presence of a minor amount of an inert dry finely divided protective media coating the bisulfate granules and isolating therein from the chlorine liberating compound.

Existing governmental regulations prohibit the sale or advertising of a product as the germicidal agent unless certain stringent tests of the effectiveness of the product under the intended conditions of use are met. A further object of the invention is, accordingly, a toilet bowl cleaner of the previously-mentioned type which satisfies these tests in all respects.

The organic chlorine liberators found satisfactory for use in the present invention are, as a class, characterized by the presence of the following radical:

which may appear in the following forms:

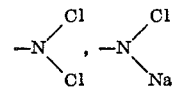

or

For convenience, this class of compounds is referred to herein as the "organic chloramines." Extensive experimentation has failed to reveal any appreciable difference in the effectiveness for present purposes of a number of readily available compounds falling within this class, provided they are soluble in water. For example, the aryl and alkyl aryl chlorosulfonamides, preferably in the form of the alkali metal salt, have been found quite satisfactory. Examples of this group are chloramine-T (sodium tolyl-N-chlorosulfonamide) dichloroamine-T, chloramine-B (sodium phenyl-N-chlorosulfonamide), the chlorobenzene- and nitrobenzene-derivatives of the latter, dichloroamine-B, N-chloroacetanilide, N-chloroformanilide, N-chloro-p-nitroacetanilide, and N-chloro-o-acetotoluide. Of equal suitability are the heterocyclic chloramines, of which may be mentioned sodium and potassium dichloroisocyanurate, mono-, di-, and trichloroisocyanuric acid, 1-chloro- and 1,3-dichloro-5,5-dimethyl hydantoin, N-chlorosuccinimide, trichloromelamine and tetrachlorogylcoluril.

The amount of available chlorine will, of course, vary from compound to compound in the above class and the quantity of chlorine actually released at the point of use will depend upon this factor as well as the quantity of the final composition that is employed. For these reasons, some adjustment in the proportion in the particular chloramine added to the composition may be desirable to provide a given level of released chlorine. As a general rule, it will be found that an amount of the chloramine in the range of about 0.05–3.0% by weight of the total composition will release sufficient chlorine for good germicidal action when dissolved in water at the normal recommended use concentration, as hereinafter specified. Within this range, about 0.1–1% is preferred. The physical form in which the chloramine is employed does not appear to be significant. It may, for example, be used as a finely divided powdered solid or as rather flat granules having a particle size of about 1/16 inch. At levels of about 0.5% and higher, the odor of chlorine may be detected by the housewife and if this should be objectionable, a lesser quantity is recommended.

The maximum of about 3% is the preferred upper limit. More specifically, the chloramine should be included in sufficient quantity to provide at least about 6 p.p.m. of free chlorine at the use concentration and at least about 18 p.p.m. is even better. At the maximum level set forth above, a quantity of free chlorine greatly exceeding these limits is provided at the use concentration, for example, 306 p.p.m. chloramine-B, 625 p.p.m. potassium dichlorocyanurate, and 899 p.p.m. trichloroisocyanuric acid.

Insofar as the major constituents of the composition are concerned, other than the protective media, they may be generally the same as is presently employed in the art. It is important that sufficient sodium bisulfate is provided to produce a pH of 5 or below at the use concentration and preferably about pH 1-2. As a practical matter, this will usually necessitate that the bisulfate predominate, i.e., constitute at least 50% by weight of the composition. Preferably, somewhat higher proportions of this ingredient are employed and about 60-80% has been found quite effective. It is most convenient to employ sodium bisulfate in the form in which it is sold in large quantities by the manufacturers, namely as prills or small nodules having a particle size corresponding to 10-60 on the Tyler screen scale. Other forms could undoubtedly be substituted but are less easily handled and mixed in large quantities. Finely divided or powdered bisulfate is not suitable as the size of the bisulfate particles must be relatively large compared to the particles of the protective medium in order for the latter to coat the former. All sodium bisulfate if exposed to the atmosphere for a sufficient period acquires a surface coating in the form of the hydrate. This is immaterial for the purposes of the present invention, except to intensify the need for the protective medium for the reason already stated.

As has already been indicated, it is desirable for the composition to include a minor amount of compound adapted to release carbon dioxide by reaction with sodium bisulfate in the presence of water. While a number of compounds are suitable for this purpose, sodium carbonate and sodium bicarbonate are ordinary employed as a practical matter. Of these, sodium carbonate may be preferable because of its relatively lower cost. As purchased by us, the sodium carbonate is in the form of particles having no regular size, but this particular form is immaterial. The amount of the carbonate salt can vary within the range of about 0.5 to 20% by weight, with about 5-15% by weight representing the preferred range. The bisulfate is, of course, consumed to a certain extent in the gas-producing reaction but when employed in the proportions indicated above a sufficient excess is available to tolerate this loss.

In addition to the carbonate compound, the composition of the present type often contains a chloride salt of an alkali metal, the most notable example of which is sodium chloride. For reasons that are not entirely understood, such a salt tends to improve the cleaning effectiveness of the composition. At the low pH's obtaining at the normal use concentration, some of the salt may react to release HCl although this is difficult to prove experimentally. Irrespective of the reason, the presence of one of these salts has been found beneficial. The amount of salt can be about 0.5 to 20% by weight.

A variety of materials of rather diverse chemical nature have been found to be more or less equally useful as the inert powdered protective medium of the present invention. For example, commercial clays, both calcined and uncalcined, of which at least 90% have a particle size of two microns or less have proved quite effective. In lieu of clay, one may substitute an inert heavy metal oxide, such as zinc oxide. Other satisfactory powdered media are pulverized silical gel, ground silica, activated charcoal, vermiculite, talc, alumina, diatomaceous earth, molecular sieves, attapulgite clay and activated alumina. A dry powdered soap of an alkali metal or heavy metal, which remains dry and does not become soft or tacky at temperatures up to about 130-140° F. gives effective stability but tends to form a curd in the toilet bowl due to the strongly acidic condition there and is less desirable for that reason. Examples of such soaps are zinc salts of oleic, stearic, palmitic, lauric and behenic acids.

On the basis of our examination to date, the important characteristics of the protective medium appears to be inertness and a fairly high degree of subdivision.

As the term is employed here, inertness means the absence of any tendency to react with, or bring about the reaction of any of the components of the composition, which, of course, means that the powder must be dry as significant amounts of moisture are conducive to reaction. The medium must retain its subdivision; thus, materials of a soft waxy, tacky or sticky nature should be avoided, as such materials ball up when tumbled with the bisulfate granules and do not distribute properly over the surface of the granules. Surprisingly, compounds which would be expected to react with the bisulfate to form a surface coating of a relatively inert reaction product, e.g. magnesium carbonate, have not proved particularly effective. Insofar as the maximum permissible particle size is concerned, a precise upper limit is difficult to determine, the principal criterion being that the protective medium particles are relatively small compared to the bisulfate granules, so as to be adapted to adhere to the granules and form a coating over their surface. With sufficiently large granules, it is believed that particles up to at least about 100 microns would not seriously detract from the results obtained and this figure may not represent the extreme upper limit. In practice, of course, a much smaller state similar to a fine powder or dust is more advantageous. In the case of clay, it is preferred that at least about 90% have a size of 2 microns or less and the optimum of size of the heavy metal oxides or the soap may well be of the same order. The amount of the inert material powder is that needed to form a thin coating of the powder over substantially the entirety of the surface area of the bisulfate granules. The formation of such a coating can be readily determined by observation of the granules under slight magnification, say 10×. Dependent upon the degree of subdivision, the amount may range broadly between 0.5-20% by weight but only about 1-5% is ordinarily required for good results.

Among the optional ingredients for the class of compositions in question may be mentioned various perfumes, wetting agents, dyes and the like. Usually, less than about 1% by weight of each of these types of additives is all that is necessary. In order to give a visual indication of the initiation of germicidal activity, it is particularly valuable to utilize a dye which in the presence of free chlorine undergoes a distinct change in color. This change may be either from a colored to an uncolored state or from one color to another. Free chlorine is a strong oxidizing agent and has been found effective to change the color of most common organic dyes. Specific examples of dyes which behave in the desired fashion are Indigotine S. Conc., C.I. No. 73,015, and Light Green S.F.A. Conc. SF, C.I. No. 42,095. The former has been found to change in color from blue to water-white and the latter from green to water-white within about 15 seconds after a composition containing the same is dissolved in water to form a dilute aqueous solution.

In order to demonstrate the improvement that can be achieved in the compositions of the present invention by virtue of the powdered protective coating on the bisulfate granules, a series of experiments were carried out with representative solid particulate organic chloramines. For the purpose of these experiments, a set of basic compositions were prepared from 75 gm. of sodium bisulfate containing 2% moisture by weight, 10 gms. of sodium chloride, 10 gms. of sodium carbonate, and 4 gms. of one of each of the following protective media: clay, zinc oxide, and dry powdered zinc stearate, along with a control consisting of the same mixture exclusive of any protective medium. The basic compositions were compounded by first mixing the protective medium and bisulfate together, where the medium was present, then adding the remaining ingredients and mixing until substantially homogeneous. The 25 gm. samples of the various basic compositions thus formulated were added 50 mgs. of the following organic chloramines; Potassium dichloroiscyanurate, chloramine-T, 1,3-dichloro-5-5-dimethylhydantoin and N-chlorosuccinimide. Each of the samples were enclosed within a glass bottle provided with a hand-tightened screw-type closure and placed in an oven maintained at 100° F. and heated for twenty hours. At the end of twenty hours, the bottles were removed from the oven and the samples analyzed to determine the amount of chloramine remaining. The results are indicated in Table I:

TABLE I

| Organic Chloramine | Protective Medium | Amount Chloramine Remaining (mg.) |
| --- | --- | --- |
| Chlorinated cyanurate | None | 2 |
| Do | Clay | 47 |
| Do | Zinc Oxide | 47 |
| Do | Zinc Stearate | 48 |
| Chloramine-T | None | 16 |
| Do | Clay | 47 |
| Do | Zinc Oxide | 46 |
| Do | Zinc Stearate | 47 |
| Chlorinated hydantoin | None | 3 |
| Do | Clay | 49 |
| Do | Zinc Oxide | 43 |
| Do | Zinc Stearate | 43 |
| N-chlorosuccinimide | None | 4 |
| Do | Clay | 51 |
| Do | Zinc Oxide | 51 |
| Do | Zinc Stearate | 50 |

The apparent increase of the N-chlorosuccinimide in some of the tests above the maximum amount possible is explained by experimental error.

In order to demonstrate the inadequacy of inorganic chlorinating agents for purposes of the present invention, the procedure summarized above in connection with Table I was repeated, using the same amount of lithium hypochlorite and calcium hypochlorite in lieu of the organic chloramine, except that clay was the only protective medium tested. The moisture content in the bisulfate was maintained below 1% to eliminate as much as possible water as a factor contributing to decomposition of the chlorine compound, the oven temperature was maintained at 125° F., and the samples were removed after sixteen hours of exposure. The results are reported below in Table II:

TABLE II

| Chlorine Compound | Protective Medium | Amount Chlorine Compound Remaining (mgs.) |
| --- | --- | --- |
| Lithium hypochlorite | None | 1 |
| Do | Clay | 1 |
| Calcium hypochlorite | None | 2 |
| Do | Clay | 4 |

It will be observed that the decomposition of these common inorganic chlorinating agents took place at substantially the same rate, irrespective of the presence or absence of the protective medium.

The value of the protective medium for purposes of the relatively stable compound, chloramine-B, was demonstrated by incorporating 1 gm. (1000 mg.) of chloramine-B into 499 gm. samples each of the basic mixtures described in connection with Table I, except that the bisulfate contained only 1% moisture by weight, sealing the samples in bottles as before, and aging the bottles at 125° F. for one week. The results of an analysis of these samples are summarized in Table III:

TABLE III

| Chlorine Compound | Protective Medium | Amount Chlorine Compound Remaining (mg.) | Percent loss |
| --- | --- | --- | --- |
| Chloramine B | None | 750 | 25 |
| Do | Clay | 960 | 4 |
| Do | Zinc Oxide | 920 | 8 |
| Do | Zinc Stearate | 920 | 8 |

One of the important advantages of the present invention is the simplicity in the mixing operation by which the present compositions are prepared. Thus, a single mixing step is all that is required. In the mixing operation, all of the bisulfate is added to any commercial dry mixer, for example, a ribbon mixer, which is then set in motion. Next, the powdered protective medium is introduced and tumbled with the bisulfate for a few revolutions, after which the remaining ingredients may be added at random. It appears to be important to the attainment of a satisfactory barrier action between the chloramine and bisulfate that the protective medium be commingled with the bisulfate before any of the other ingredients are introduced. Thus, when the bisulfate granules and the powdered medium are stirred, shaken or tumbled together, the powder adheres to the surface of the granules, forming a light, thin layer or coating of the powder particles on the granule surface. The layer or coating remains intact during the subsequent mixing and filling phases and prevents the subsequently added ingredients from making reactive contact with the bisulfate granules by isolating the granule surface from the other ingredients, especially the chloramine.

Reference has already been made to standard test procedures for determining the germicidal activity of commercial products. There are two such tests: the so-called "Use Dilution" method, which is the approved procedure of the Department of Agriculture, and the so-called "Webber and Black" method which is the standard applied by the Food and Drug Administration. These are described in detail in "Official Methods of Analyses of the Association of Official Agricultural Chemists" (9th ed.), pages 65–66 and 70–72, respectively. In general, the use dilution method is intended to test the ability of a particular germicidal solution to kill heavy concentrations of a given bacteria, such as *S. aureus*, *S. typhosa*, or *S. chloerasuis*, that have been previously applied to metal rings and dried, within a contact time not in excess of ten minutes. According to this method, ten metal rings are immersed in a medium which has been innoculated with a particular bacteria in a concentration in excess of 100 million organisms per cc. The rings are then withdrawn and allowed to dry. When dry, they are placed in ten dry sterile tubes and the desired solution of the germicide to be tested is added to the tubes. After a contact time of not more than ten minutes, the rings are removed from the tubes aseptically and placed in a sub-culture media tube containing an appropriate nutrient together with a neutralizer for the residual germicide, if any. The sub-culture media containing the ring is incubated for 36–48 hours, which is entirely adequate for the growth of any organisms remaining alive after the treatment. In order to give a statistical confidence level of 95%, which is required to pass the tests, 50 tubes out of 50 so processed must show negative results, i.e. must be free of bacterial growth.

The Webber and Black method demands that the germicidal agent must kill 99.999% of the organisms present, which may be either *E. coli* or *S. aureus*, within a contact time not in excess of 30 seconds. According to this procedure, 1 cc. of a medium containing 10 billion organisms per cc. is introduced with swirling by a pipett into 99 cc. of the germicidal solution to be tested. After the predetermined period of contact, i.e. 30 seconds or less, 1 cc. of the resultant solution is removed and added to 10 cc. of a sub-culture media containing a neutralizer of the residual germicide. The media is then incubated for 36-48 hours in petri dishes, so that any viable organisms will multiply, and at the end of this time, the bacteria population is counted. The number of organisms so counted must not exceed 0.001% of the initial bacterial population to pass the test.

Solutions of compositions according to the present invention are prepared for use in the above tests by dissolving 153 gms., i.e. ½ cup, of the composition of 2830 cc. of water, this being the normal recommended concentration for use in the home, referred to earlier.

A preferred composition of the present invention is as follows.

| Material: | Percent by wt. |
|---|---|
| Sodium bisulfate prills | 75 |
| Clay (sold under the trade name "Icecap K") | 4 |
| Sodium carbonate | 10 |
| Sodium chloride | 10 |
| Dye (Light Green SFA Conc. SF) | 0.003 |
| Chloramine-B | 0.4 |

The remainder of the compound to make up 100% may be composed of small amounts of each of a perfume and a wetting agent (Ultrawet SKB). This formulation has been tested at the above indicated dilution according to both of the methods described above. Only about two minutes of contact time was required to pass the use dilution test and a 100% kill of the test bacteria after only 15 seconds of contact time was obtained in the Webber and Black test. Other compositions prepared within the ranges described herein will likewise give satisfactory results with these procedures so long as the amount of the organic chloramine is so selected as to provide about 6 p.p.m. of free chlorine in the use dilution test and about 18 p.p.m. of free chlorine for the Webber and Black tests, each at the concentration level prescribed above.

In the above preferred embodiment, the other organic chloramines specifically enumerated herein may be substituted for the chloramines-B without lessening the performance of the composition to an unacceptable extent. Similarly, the clay can be replaced with any of the other named powdered media with good results.

In order to demonstrate the failure of the known prior art to suggest the gist of this invention, several comparative tests were carried out. In the first such test, Example III of Lee et. al. 3,120,378 was re-created except that the mixture was left in the granular state instead of being tabletted. Thus, the following amounts of the following compounds were mixed together, the materials being similar in grade and condition to the same materials used in the examples of the invention:

| | Gms. |
|---|---|
| Potassium dichlorocyanurate | 4.8 |
| Sodium carbonate monohydrate | 2.5 |
| Sodium bisulfate | 1.7 |

A sample of this mixture in granular condition was tested for stability as before, that is, placed in hand-tightened screwcap jars and maintained at 125° F. After three days storage, the sample was analyzed for chlorine content and was found to have lost 29.4% of its available chlorine.

The foregoing test was repeated except that a typical synthetic organic detergent, as named by Lee et al., sodium lauryl sulfate, was added in the amount of 1% by weight of the mixture in order to reveal the effect of the presence of a soap equivalent used simply as another ingredient and not as the powdered medium of the invention. On analysis, a sample of this mixture after storage for the same time and under the same conditions, was found to have lost 37.0% of its available chlorine.

In another test, the stabilizing procedure disclosed in Pape 2,497,057 was applied to the following formulation.

| Ingredient: | Percent by wt. |
|---|---|
| Sodium bisulfate | 75 |
| Sodium carbonate | 10 |
| Sodium chloride | 12.50 |
| Carbowax 4000 | 2.00 |
| Potassium dichlorocyanurate | 0.50 |

This was done by dissolving the Carbowax in a solvent therefor, toluol, applying the resultant solution separately to the bisulfate and carbonate particles which were then dried by a current of air at 100° F. The coated particles were next combined with each other and with the remaining ingredients. A sample of the mixture so obtained was placed in a hand-tightened screw-cap jar and stored in an oven at 125° F. After two days of such storage, the sample was analyzed and was found to have only 14% of its original chlorine content.

The procedure just described was repeated with the same formulation except that Carbowax 1500 was substituted for the Carbowax 4000. A sample of this mixture was tested and analyzed as before with the same result, namely, only 14% of the original chlorine content remained.

Several incidental difficulties were noted in the course of carrying out the above procedure. First, the evaporation of the solvent from the bisulfate and carbonate particles required an inordinately long time and even then the odor of the solvent could be detected. The selection of a perfume effectively masking this odor could be an added complication. Second and more significant, the Carbowax-containing formulations tended to clump badly and to develop off odors, either of which characteristics would be most undesirable in a commercial product.

To further determine the compatibility of the Carbowaxes proposed by Pape with the chlorinating agents used in this invention, identical amounts of the preferred embodiment of the invention as hereinbefore disclosed were dissolved in three beakers of water, one having 2% Carbowax 4000 added thereto, another the same amount of Carbowax 1500 added thereto, the third being plain water as a control. These solutions were then periodically analyzed for chlorine content with the following result:

| Elapsed time after addition (min.) | Available percent chlorine remaining in solution containing— | | |
|---|---|---|---|
| | Carbowax 4000 | Carbowax 1500 | Water Only |
| 4 | 61 | 62 | 88 |
| 9 | 30 | | |
| 10.5 | | 41 | |
| 13 | 17 | | 74 |
| 18.5 | | 37 | |
| 31.5 | | 24 | |
| 36 | | | 41 |
| 53 | | | 35 |

Having thus described our invention, that which is claimed is:

1. A solid particulate toilet bowl cleaning composition having germicidal properties and being capable on being dissolved in the water of the toilet bowl of removing stains due to metallic salts; said composition consisting essentially by weight of a substantially homogeneous admixture, at least 50% of sodium bisulfate granules, 0–20% of an alkali-metal carbonate releasing carbon dioxide in acid solution, 0–20% sodium chloride, 0.05–3% of a solid, pulverulent, water-soluble organic chloramine, and from 0.05–20% of a dry, inert, powdered protective medium having a particle size up to about 100 microns and selected from the group consisting of clays, zinc oxide, pulverized silica gel, ground silica, vermiculite, talc, alumina, diatomaceous earths and zinc soaps.

2. The composition of claim 1 wherein at least 0.5% by weight of each of said carbonate and said sodium chloride is present.

3. The composition of claim 1 including 60–80% sodium bisulfate, 5–15% carbonate salt, and 0.1–1.0% organic chloramine.

4. The composition of claim 1 wherein said powdered medium has a particle size of about 2 microns.

5. A composition according to claim 1 wherein said organic chloramine is sodium phenyl-N-chlorosulfonamide and said powdered protective medium is clay.

References Cited by the Examiner

UNITED STATES PATENTS

| 2,034,070 | 3/1936 | Weygandt | 252—142 |
| 2,497,057 | 2/1950 | Pape et al. | 252—142 |
| 2,893,836 | 7/1959 | Davis et al. | 252—142 |
| 3,054,753 | 9/1962 | Hurt et al. | 252—95 |

FOREIGN PATENTS 832,105  4/1960  Great Britain.

LEON D. ROSDOL, *Primary Examiner.*

ALBERT T. MEYERS, *Examiner.*

S. E. DARDEN, *Assistant Examiner.*

UNITED STATES PATENT OFFICE
CERTIFICATE OF CORRECTION

Patent No. 3,318,815           Dated   May 9, 1967

Inventor(s)  Harry E. Remler, et. al.

It is certified that error appears in the above-identified patent and that said Letters Patent are hereby corrected as shown below:

Column 10, line 74, "0.05 - 20%" should read -- 0.5 to 20% -- .

Signed and sealed this 28th day of August 1973.

(SEAL)
Attest:

EDWARD M. FLETCHER, JR.                RENE D. TEGTMEYER
Attesting Officer                      Acting Commissioner of Patents